United States Patent [19]
Tokumaru et al.

[11] Patent Number: 5,274,409
[45] Date of Patent: Dec. 28, 1993

[54] CAMERA WITH MULTIPLE LENS DRIVING MODES

[75] Inventors: Hisashi Tokumaru, Osakasayama; Masayuki Ueyama, Toyonaka; Yasuaki Serita; Minoru Kuwana, both of Sakai; Hiroshi Ootsuka, Sakai, all of Japan

[73] Assignee: Minolta Camera Kabushiki Kaisha, Osaka, Japan

[21] Appl. No.: 883,916

[22] Filed: May 12, 1992

Related U.S. Application Data

[63] Continuation of Ser. No. 810,570, Dec. 20, 1991, which is a continuation of Ser. No. 715,885, Jun. 18, 1991, abandoned, which is a continuation of Ser. No. 580,594, Sep. 11, 1990, abandoned.

[30] Foreign Application Priority Data

Sep. 11, 1989 [JP] Japan .................. 1-235434

[51] Int. Cl.⁵ .................................................. G03B 1/18
[52] U.S. Cl. ................................................... 354/195.1
[58] Field of Search .................................... 354/195.1

[56] References Cited

U.S. PATENT DOCUMENTS

| | | | |
|---|---|---|---|
| 4,508,443 | 8/1983 | Matsuzaki et al. | 354/195.1 |
| 4,780,738 | 7/1986 | Fukahori et al. | 354/195.1 |
| 4,816,860 | 3/1989 | Iida et al. | 354/402 |
| 4,851,869 | 7/1989 | Ishimaru et al. | 354/195.1 |
| 4,972,215 | 11/1990 | Kitamura et al. | 354/195.1 |

FOREIGN PATENT DOCUMENTS

| | | |
|---|---|---|
| 61-128612 | 8/1986 | Japan . |
| 62-272215 | 11/1987 | Japan . |
| 63-113430 | 5/1988 | Japan . |
| 63-303311 | 9/1988 | Japan . |
| 64-15724 | 1/1989 | Japan . |
| 1-108514 | 4/1989 | Japan . |
| 2-16343 | 5/1990 | Japan . |

*Primary Examiner*—Michael L. Gellner
*Assistant Examiner*—Howard B. Blankenship
*Attorney, Agent, or Firm*—Burns, Doane, Swecker & Mathis

[57] ABSTRACT

The present invention discloses a camera having power zooming function to execute zooming by electric power in accordance with manual operation and power focusing function to execute focusing by electric power in accordance with manual operation, in which both the power zooming and power focusing can be executed by one operation member.

The operation member can be rotated and moved back and forth, and can execute power zooming responding to its rotation and power focusing responding to its movement back and forth.

50 Claims, 13 Drawing Sheets ns. In addition,
CAMERA WITH MULTIPLE LENS DRIVING MODES This application is a continuation of application Ser. No. 07/810,570, filed Dec. 20, 1991, which is a continuation of application Ser. No. 07/715,885, filed Jun. 18, 1991, which is a continuation of application Ser. No. 07/580,594, filed Sep. 11, 1990, each now abandoned.

BACKGROUND OF THE INVENTION

1. Field of the Invention

This invention relates to a camera having multiple lens driving modes, for example, power zooming function executed by electric power and power focusing function executed by electric power.

2. Description of the Prior Art

It was proposed to mount a rotary operation member on a camera lens so as to select the direction of power zooming depending on the direction of its rotation (Japanese Laid-Open Patent No. 62-272215).

Another camera marketed was designed to mount a rotary operation member on the grip of a camera body so as to use it as a power zooming operation member when autofocus (AF) mode was selected and to use it as a power focusing operation member when AF mode was not selected.

In the above prior art, only power zooming or power focusing could be executed by the rotary operation member. In order to execute both power zooming and power focusing in one mode, it was necessary to mount two rotary operation members, and as a result, the external camera structure became complex. In addition, when independent operation members were provided for power zooming and focusing, controllability was diminished.

SUMMARY OF THE INVENTION

To solve the above problems, it is a primary object of this invention to provide a camera having power zooming and power focusing function wherein both functions can be performed by one operation member.

It is another object of this invention to provide a camera having multiple lens driving modes wherein mode change and lens drive can be operated by one operation member.

To achieve the above object, according to the present invention, a camera comprising; an operation member manually operable in the direction of clockwise, counterclockwise, back and forth first detecting means for detecting rotating movement of said operation member; second detecting means for detecting back and forth movement of the above operation member; power zooming means for executing zooming operation in response to output of one detecting means; and power focusing means for executing focusing operation in response to output of the other detecting means.

According to the present invention, camera is designed to provide two methods of operation, i.e. rotary operation and the back and forth shifting operation of an operation member, and also to select the direction of power zooming in accordance with the direction by one operation, and control the direction of power focusing in accordance with the direction by another operation. It therefore becomes possible to control the direction of power zooming and power focusing with one operation member, thereby simplifying the external structure of the camera and improving its controllability.

Further objects, features and advantages of the present invention will appear more fully from the following detailed description of preferred embodiments of the invention.

DETAILED DESCRIPTION OF THE PREFERRED EMBODIMENTS

The single lens camera system with zoom lens of the preferred embodiment is explained below. FIG. 1(a) shows the external structure of the camera body and FIG. 1(b) shows the external structure of an interchangeable lens which is mounted on the above camera body. The names and functions of the various parts of the camera body are briefly explained below.

The switch 11 is a sliding switch for turning on the main switch. When this sliding switch 11 is set in the ON position, the camera is ready for operation and when it is set in the OFF position, the camera cannot be operated.

The button 12 is a release button. When it is pushed partway down to the first stage, the preparation switch (S1, described below) is turned ON, which starts the autofocusing operation.

Figure 1:
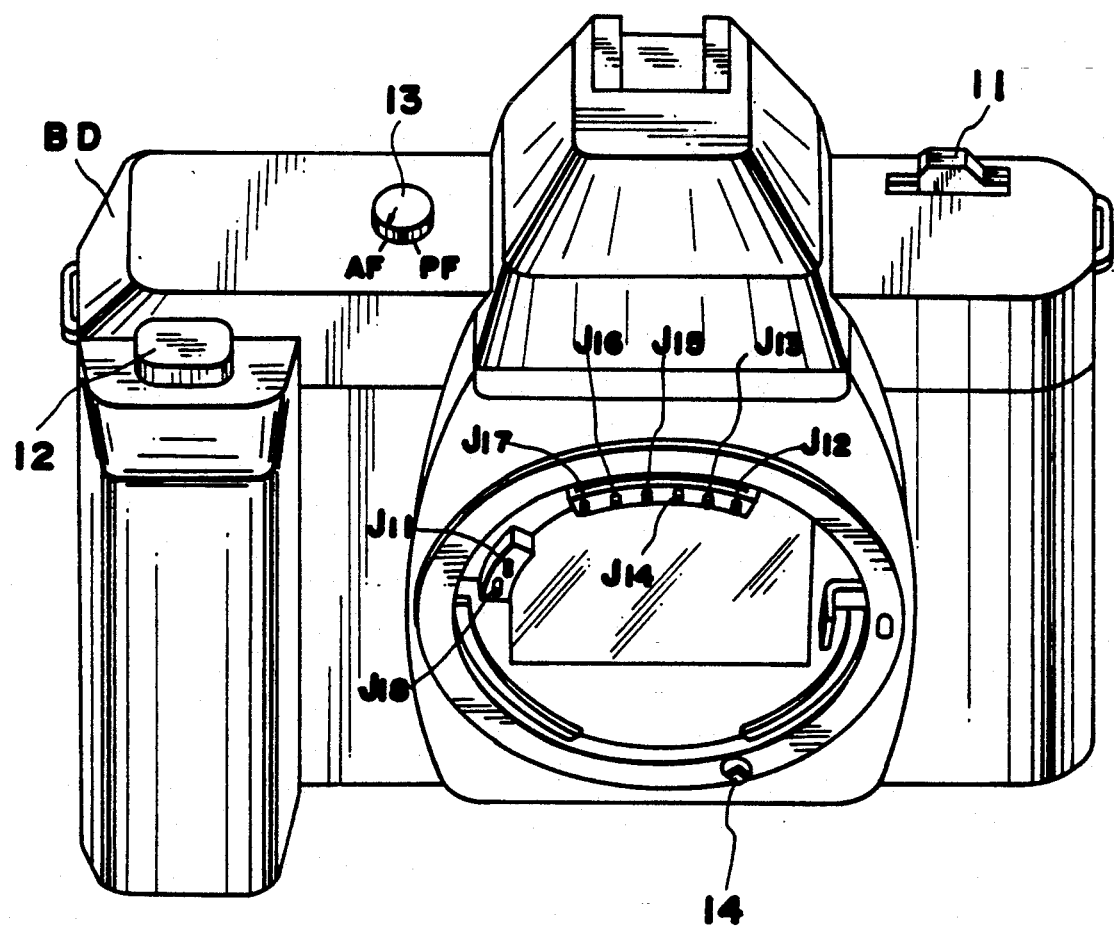
FIGS. 1(a) and (b) are perspective views showing external structures of the camera body and an interchangeable lens, respectively, of an embodiment of this invention.
Figure 1:
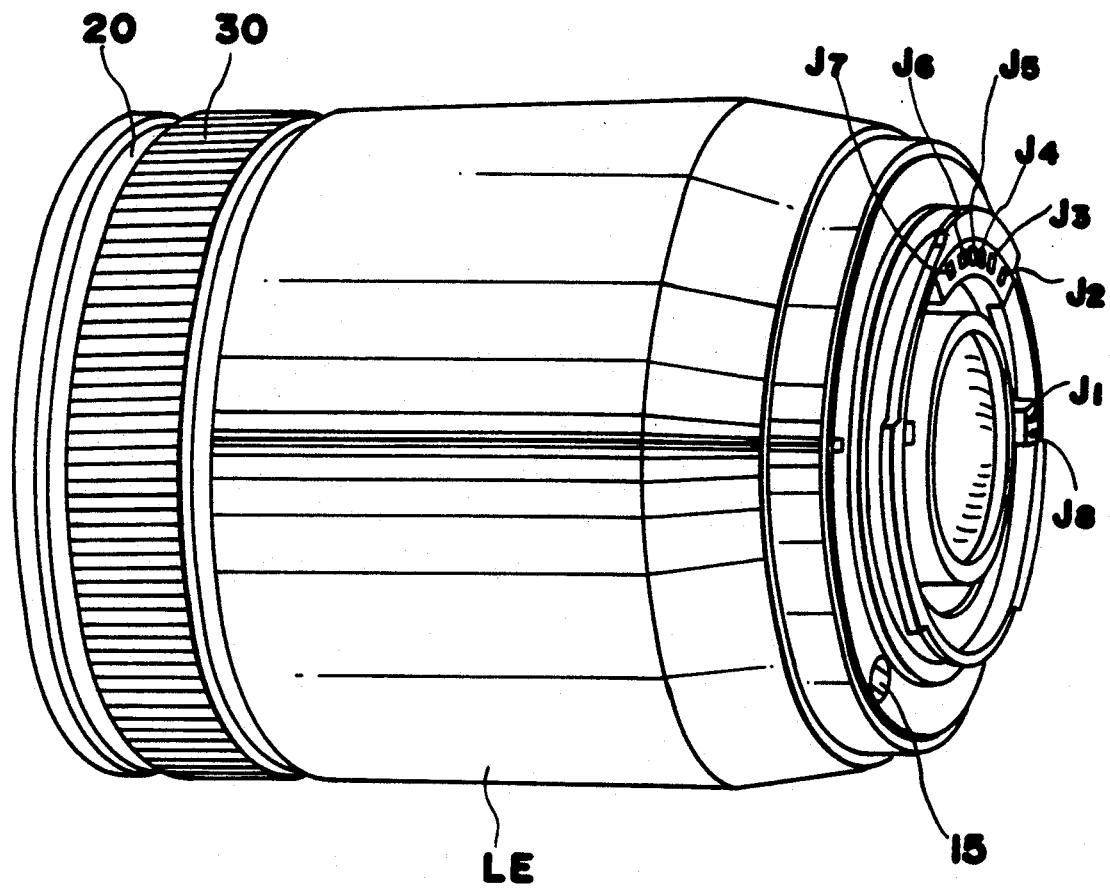

The switch 13 is a switch for changing modes between autofocus and power focus. When it is set to the autofocus position as shown in FIG. 1, switch S2 (described below) is turned ON.

The protruding member 14 is an AF coupler, which is rotated according to the rotation of an AF motor in the camera body.

The names and functions of various parts in the interchangeable lens are described next.

The recessed member 15 is an AF coupler. When the interchangeable lens is mounted on the camera body, the convex part of the AF coupler on the body side is engaged with the concave part of the AF coupler on the lens side; the rotation of the AF motor on the body side is transferred to the lens side through AF coupler 14 and 15, and the focusing lenses are shifted, thereby adjusting the focus for objects at a distance. Connections are similarly made between terminals J1 to J8 on the lens side and terminals J11 to J18 on the body side.

The cylindrical member 20 is the lens barrel of the interchangeable lens. The cylindrical member 30 is an operation ring, which can be moved back and forth relative to the lens barrel, and rotated. When it is rotated, power zooming is selected, and when it is moved back and forth, the direction and speed of focusing are specified. This operation is described in detail below.

Figure 2:
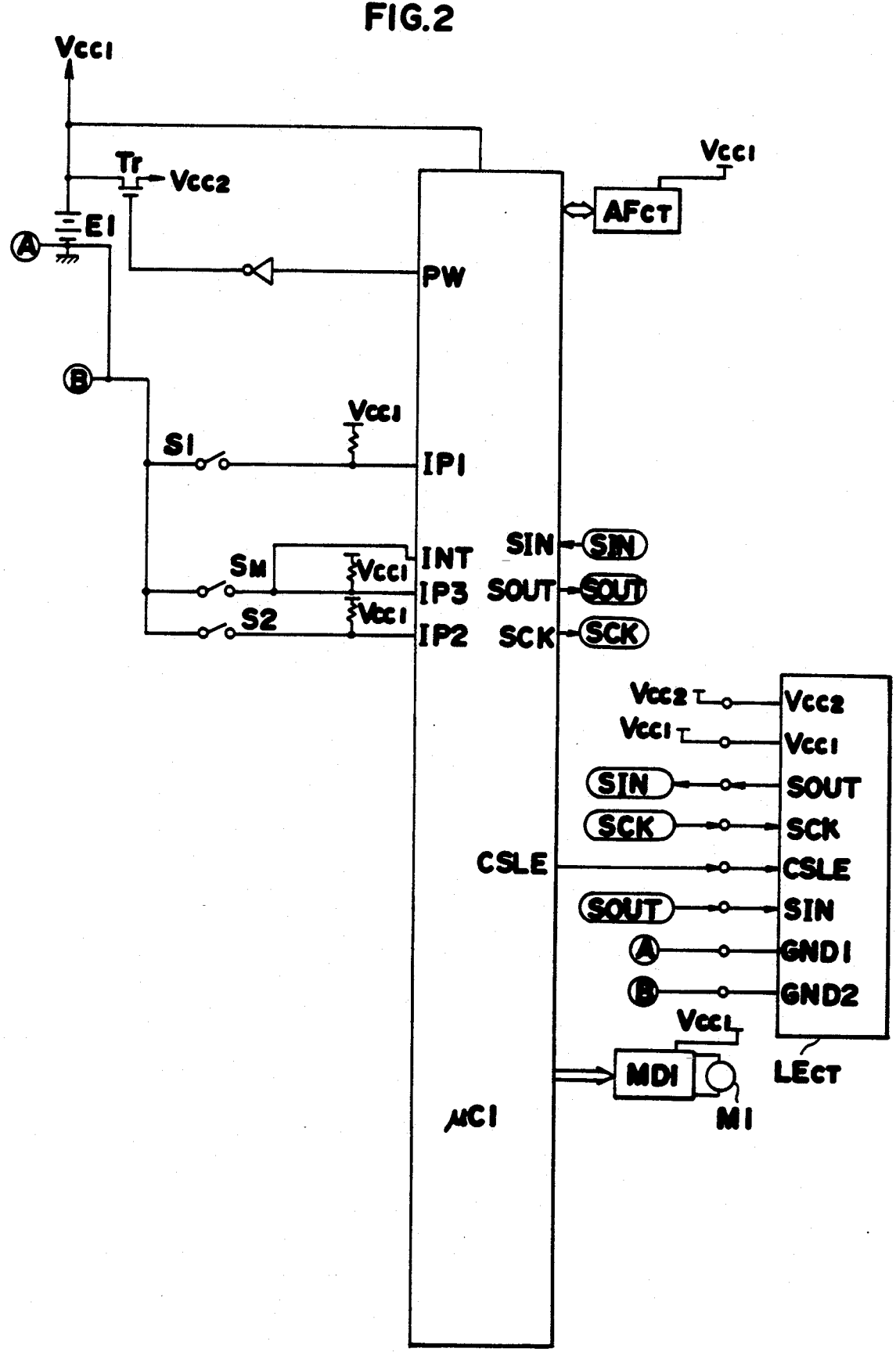
FIG. 2 is a block diagram of the above camera body.

Next, the circuit configuration of the camera system is described. Reference is first made to FIG. 2 which is a circuit diagram of the inbody circuit built into the camera body.

The microcomputer is an in-body microcomputer for controlling the entire camera, and executing various calculations.

The module AFct is a light receiving circuit for detecting focus, and is comprised of a CCD for focus detection, a driving circuit for the CCD, and a circuit for processing the CCD output, performing A/D conversion, and delivering data to the in-body microcomputer. This circuit is connected to the in-body microcomputer through a data bus. Through this light receiving circuit for focus detection, data is received on the focus deflection of a specific subject located in the metering area.

The module LEct is an in-lens circuit built into the interchangeable lens, which supplies data specific to the interchangeable lens to the in-body microcomputer. This in-lens circuit system is described below.

The motor M1 is an AF motor, which drives the focusing lenses in the interchangeable lens through AF couplers 14 and 15.

The circuit MD1 is a motor driving circuit for driving the AF motor according to the focus detection data or power focusing data. It controls right rotation, reverse rotation, and stopping of the motor depending on signals received from the in-body microcomputer.

Next, the power supply configuration is explained. A battery E1 is the power source of the camera body. A power transistor Tr supplies power to drive the zoom motor in the lens and has a MOS structure. A ground line GND1 is for low-power consumption and runs between the lens and body through terminals J17, and J7. In the body, it is necessary to provide two separate ground lines, analog and digital, but they are represented by a single line in the figure. A ground line GND2 is for high-power consumption and runs between the lens and body through terminals J18 and J8.

The switches are next described below.

The switch S1 is a preparation switch which is turned ON by pushing the release button to the first stage. When this switch is turned ON, preparatory operations for photo-taking, including autofocusing, begin.

The switch SM is the main switch. It is ON when the sliding switch, which enables operation of the camera, is located in the ON position, and is OFF when the sliding switch is located in the OFF position. When the switch is turned from OFF to ON, a low level signal is sent into an interruption terminal on the in-body microcomputer as an interruption signal.

The switch S2 is a switch which is ON when the knob for shifting between autofocus and power focus modes is located in the AF position, and which is OFF when the knob is located in the PF position.

The serial data communication system is explained below.

Three signal lines are connected to the in-lens circuit through terminals J16 and J6, J15 and J5, and J14 and J4, respectively. Communication is initiated by the microcomputer, which shifts terminal CSLE to a low level when communicating with the in-lens circuit, the signal being transferred to the in-lens circuit through terminals J3 and J13.

Figure 3:
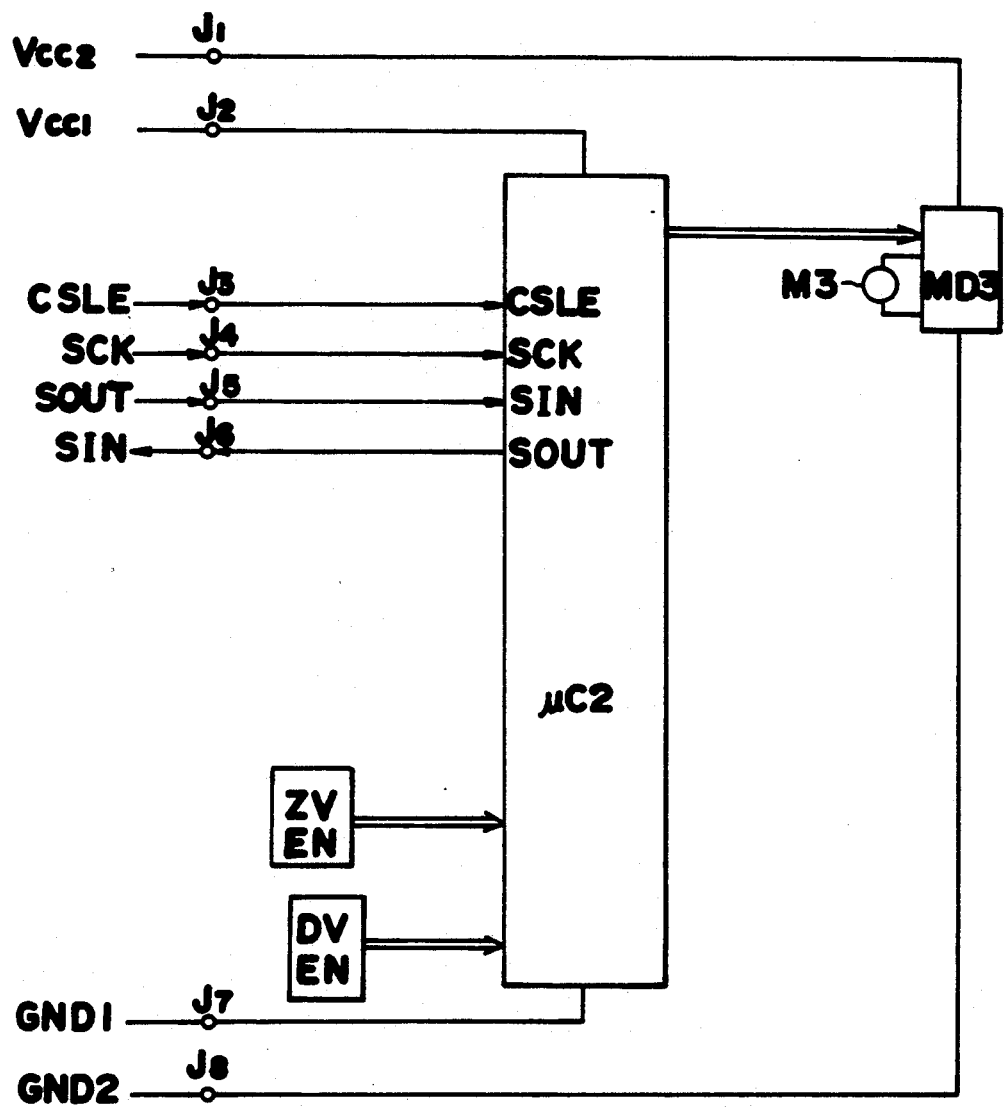
FIG. 3 is a block diagram of the above interchangeable lens.

FIG. 3 is a circuit diagram of the in-lens circuit built into the interchangeable lens. In this figure, the microcomputer is an in-lens microcomputer for controlling the zoom motor built into the interchangeable lens, and for controlling data communication with the camera body. This microcomputer starts up when the interchangeable lens is mounted onto the camera body and a supply voltage Vcc2 is supplied. It then waits until interruption occurs, which is described below.

Here, terminals J1 through J8 connected with the camera body are described. The terminal J1 is a power source terminal for supplying supply voltage Vcc2 used for driving the zoom motor, from the body side to the lens side. The terminal J2 is a power source terminal for supplying supply voltage Vcc1 used for parts other than the above zoom motor, from the body side to the lens side. The terminal J3 is a terminal for entering signals which indicate a request for data communication. The terminal J4 is a clock terminal for synchronizing data communication from the body side. The terminal J5 is a serial input terminal for entering data from the body side. The terminal J6 is a serial output terminal for delivering data to the body side. The terminal J7 is a ground terminal for circuits other than the motor driving circuit, and the terminal J8 is a ground terminal for the motor driving circuit.

When a signal on terminal CSLE, transferred through terminals J3 and J13 between the interchangeable lens and the body, is transferred from the in-body microcomputer to the in-lens microcomputer, an interruption occurs in the in-lens microcomputer. This causes the in-lens microcomputer to start up, and the interchangeable lens is specified as the unit communicating with the body.

The module ZVEN is a zoom setting encoder linked with the rotation of the aforementioned operation ring, and it sets the direction of power zooming.

The module DVEN is a power focus setting encoder linked with the back and forth movement of the aforementioned operation ring, and it sets the direction of power focusing.

The motor M3 is a zoom motor for driving the zoom ring, and is not shown in the figure.

The circuit MD3 is a motor driving circuit for driving the zoom motor, and it controls the rotation of the zoom motor according to the control signals sent from the in-lens microcomputer which determine the driving direction and driving speed of the motor. It also short-circuits both ends of the zoom motor and intercepts voltage to the motor in response to the motor stop signal and motor rest signal given from the in-lens microcomputer.

With this invention, in order to set the direction of power zooming, the operation ring is equipped with a rotation type switch, and in order to operate power focusing, the ring is equipped with a sliding type switch.

Figure 4:
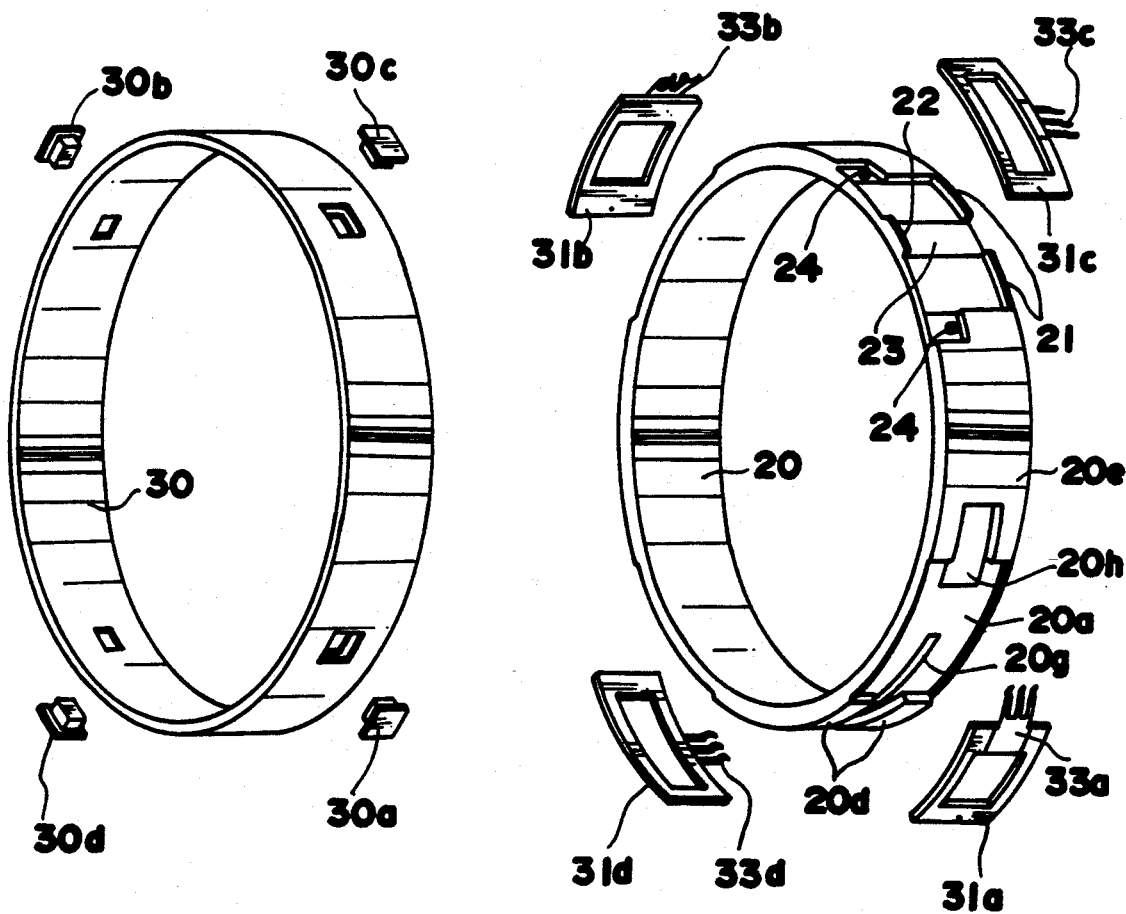
FIG. 4 is an exploded perspective view of an operation ring used in the above interchangeable lens.
Figure 5:
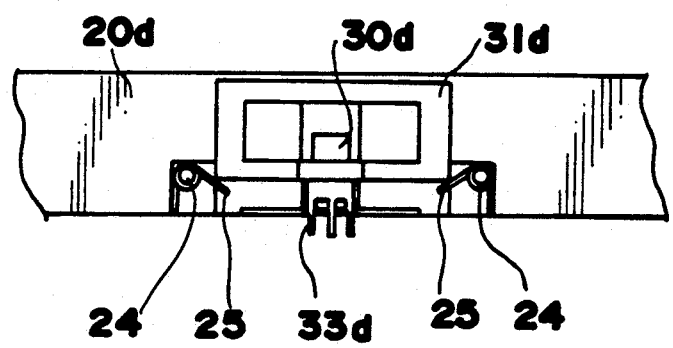
FIGS. 5(a), (b) and FIG. 6 are developed views of principal parts of the above camera.
Figure 5:
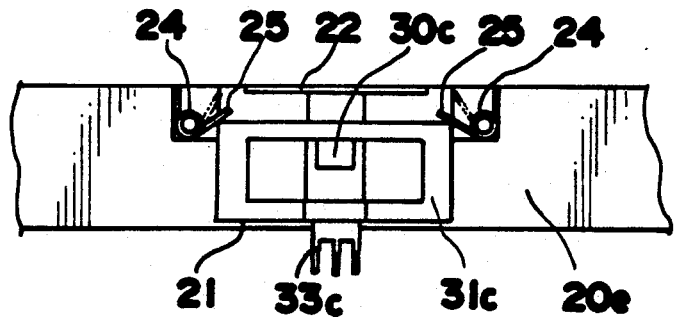
Figure 6:
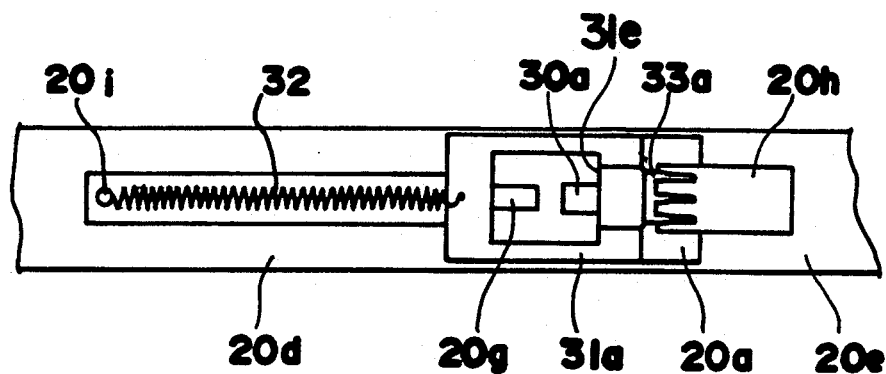

FIG. 4 is an enlarged detail of the switch built into the operation ring. This switch works as a switch for setting the direction of power zooming by rotating the operation ring, and as a switch for setting the direction of power focusing by pushing or pulling the ring back and forth. FIGS. 5(a), 5(b) and 6 are developed drawings along the circumferential direction of the above operation ring. In these figures, reference numeral 20 denotes a fixed lens barrel, reference numeral 30 denotes the operation ring, reference numerals 30a through 30d denote inside protrusions, reference numerals 31a through 31d denote rectangular frame members, reference numeral 32 denotes a coil spring for automatic recovery, and reference numerals 33a through 33d denote brushes. Rectangular frame member 31a is located on the fixed lens barrel at a recessed section where the diameter is reduced, and rectangular frame member is located on the fixed lens barrel at the section where the diameter is reduced on the opposite side.

FIG. 6 shows a radial view of the switch on the side of rectangular frame member 31a. The switch on the side of a rectangular frame member 31b is symmetrical and is not shown in the figure. Rectangular frame member 31a is usually pulled by the coil spring mounted along a guide groove, and is controlled to stay at the end of the section where the diameter is large on the fixed lens barrel. The other end of the coil spring is fixed on a protrusion of the fixed lens barrel. The operation ring is designed so that the inner face matches with sections 20d and 20e where the diameter is large on the fixed lens barrel, and inside protrusions 30a and 30b match is penetrated through the rectangular frame indicated by rectangular frame members 31a and 31b and freely movable within the rectangular frame respectively. Inside protrusion 30a roughly abuts against the inside wall 31e on the this rectangular frame, as shown in FIG. 6. Inside protrusion 30b is similarly arranged in the corresponding position, in the same way as in the inside protrusion 30b. In this example, rectangular frame members 31a and 31b are equipped with brushes 33a and 33b, and each brush has three fingers. A code plate composed of a flexible print plate is located on the concave part of the lens barrel so as to correspond to brush 33a, and another code plate is located in the same way for brush 33b, but the code plates are omitted from the figure for simplicity. The aforementioned encoder ZVEN is composed of these two brushes, 33a and 33b, and the code plates. Amount of operation from an initial position is detected by the encoder ZVEN.

The operation of the rotary switch is explained below. First, when rotating the operation ring to the right in FIG. 6, rectangular frame member 31a is engaged with inside protrusion 30a and is rotated against the tensile force of the coil spring along the section with a small diameter until abutting against the end of the section with a large diameter. Then brush 33a, integrally mounted on rectangular frame member 31a, slides onto the code plate, which is not shown in the figure, and switching is performed in accordance with the preset pattern. At the same time, inside protrusion 30b moves inside the rectangular frame indicated by rectangular frame member 31b, but the rectangular frame is sized such that no regulation occurs between inside protrusion 30b and rectangular frame member 31b. When the operator detaches his/her hand from the operation ring, the operation ring rotates rapidly in reverse by the recovery force of the coil spring and returns to the initial position. This ring operates in the same way with rotation in the reverse direction; that is, the operation ring can rotate both to the right and to the left, and automatically returns upon being let free.

Rectangular frame members 31a and 31b are also provided with clearance in the direction of the optical axis so that inside protrusions 30a and 30b can move freely when the operation ring moves back and forth, and rectangular frame members 31a and 31b as well as brushes 33a and 33b stay still during this back and forth movement. Inside protrusions 30a and 30b are constructed as separate members from the operation ring for the convenience of assembling. This is the same for inside protrusions 30c and 30d.

The mechanism of the switch as it moves back and forth is explained next. The member 31c is a rectangular frame member designed for automatic recovery after an advancing operation, and it is usually pushed against the step part on the back of the operation ring by a twisted spring as represented by the solid line in FIG. 5. At this moment, inside protrusion 30c located in the rectangular frame abuts against or has a slight clearance with rectangular frame member 31c. Brush 33c is fixed on rectangular frame member 31c and its fingers slide onto a code plate made of a flexible print plate, which is mounted on a flat section of FIG. 4 on the fixed lens barrel but not shown in the figure. When the operator pushes the operation ring forward, rectangular frame member 31c is pulled by inside protrusion 30c, and shifts forward against the twisted spring to abut against a stopper. At this time, the twisted spring deforms as shown by the broken line in FIG. 5(a). Brush 33c, integrally connected with rectangular frame member 31c, slides onto the code plate and executes the switching operation according to the preset pattern. Then, when the operator detaches his/her hand from the ring, rectangular frame member 31c and the operation ring return to the initial position by the recovery force of the twisted spring. The rectangular frame indicated by rectangular frame member 31d is designed to have enough clearance so that inside protrusion 30d, shown in FIG. 5(b), does not interfere with rectangular frame member 31d during this operation. Rectangular frames indicated by rectangular frame members 31c and 31d also have sufficient clearance in the rotation direction so as not to interfere with inside protrusions 30c and 30d when the operation ring is rotated. As a result, rectangular frame members 31c and 31d as well as brushes 33c and 33d stay still during rotation of the operation ring.

The automatic recovery mechanism utilized during the retracting operation shown in FIG. 5(b) is the same as the automatic recovery mechanism utilized during the advancing operation, shown in FIG. 5(a), except for the operation direction, and a duplicate explanation is therefore omitted. Brushes 33c and 33d, which move back and forth during this operation, and the code plate on which these brushes slide from the aforementioned encoder DVEN. By using an electrical switch with this construction, execution of power zooming and power focusing by one operation ring is easily performed, and controllability can be improved.

Figure 7:
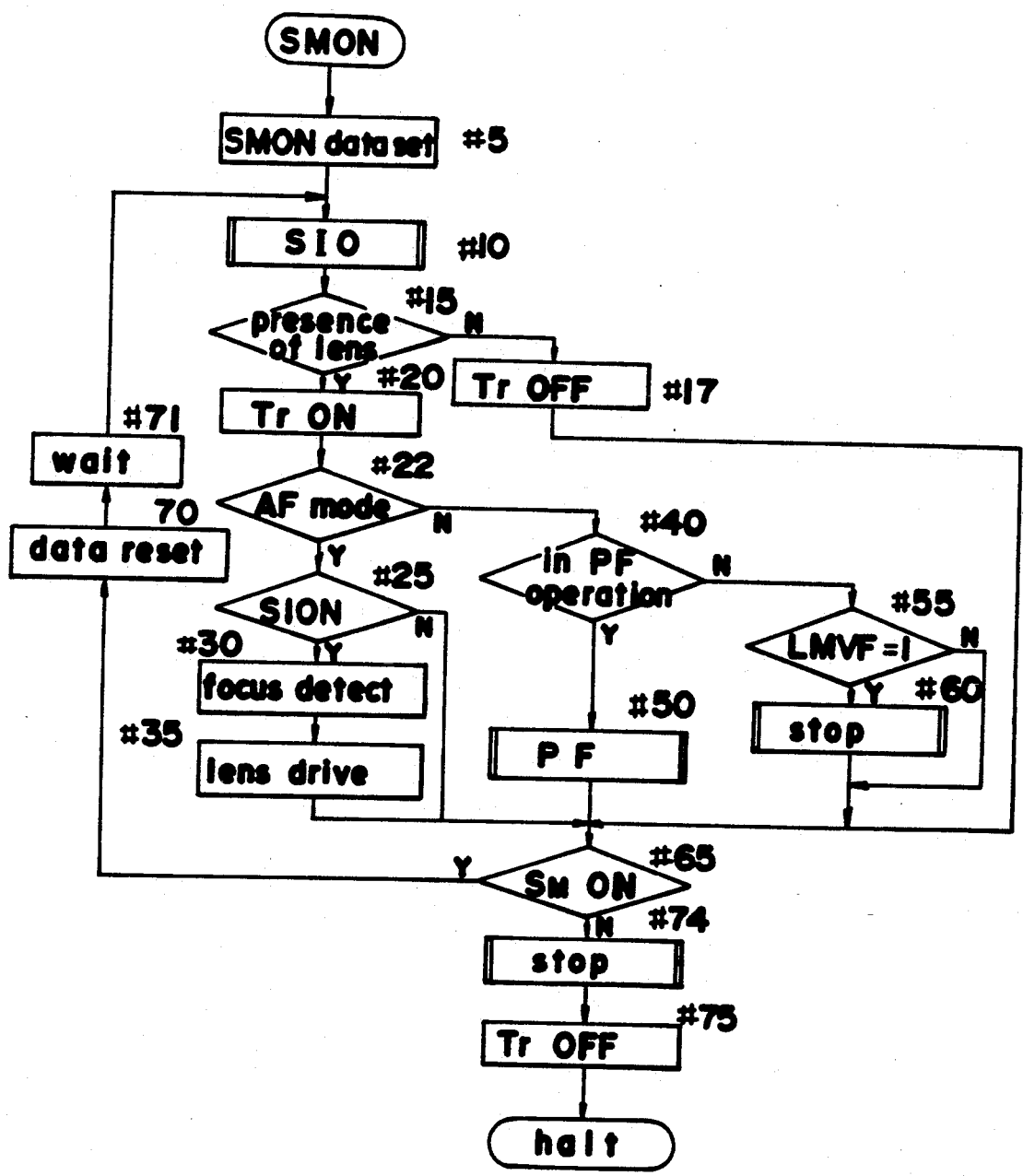
FIGS. 7 to 10 are flowcharts showing the action of the body of the above camera.

Referring now to the flowcharts shown in FIGS. 7 through 10, the operation of the in-body microcomputer is explained below. When the main switch SM is switched from OFF to ON, a signal indicating a change from high level to low level is placed on the interruption input terminal INT, a clock oscillator which is not shown in the flowchart begins operation, and the in-body microcomputer executes and interrupt routine SMON, as shown in FIG. 7. In order to indicate that the control flow is a result of the interrupt SMON, SMON data is output from the body to the lens (step #5). A serial communication subroutine is then executed (step #10).

Figure 8:
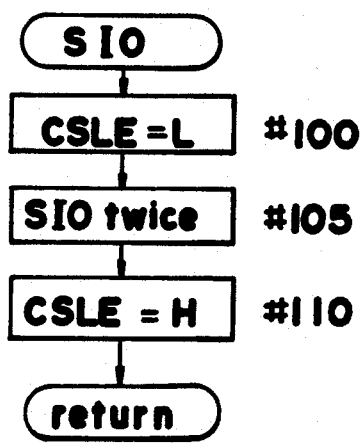

This serial communication subroutine is shown in FIG. 8. When this subroutine is called up, terminal DSLE is switched to the low level, and after executing serial communication twice, terminal CSLE is changed to the high level, and the process returns steps #100 through #110). As for the twice executed serial communication, in the first communication, SMON data indicating that the main switch is currently in the ON position, and the data indicating either AF mode or PF mode, are sent from the body to the lens. Data indicating whether or not power focusing is in operation, m indicating the direction of power focusing, indicating amount of operation of the operation ring 30, and indicating the presence or absence of the lens are sent back from the lens to the body. In the second communication, a conversion coefficient for converting the degree of focus deflection into the degree of lens drive is sent from the lens to the body, and nothing is transmitted from the body to the lens.

In this embodiment, the conversion coefficient is fixed without depending on the focal length, but it is possible to mount an encoder for detecting focal length, and to change the conversion coefficient depending on the focal length.

After executing the serial communication subroutine in step #10 in FIG. 7, the presence or absence of the lens is judged in step #15. When a lens is judged to be mounted in step #15, the transistor Tr for supplying the zoom motor is turned ON in step #20, and whether AF mode is selected or not is judged in step #22. When AF mode is selected, whether the preparation switch is ON or not is judged in step #25. When the preparation switch is judged to be ON in step 325, the focus point is detected, the degree of focus deflection is calculated, and the degree of AF lens driving is determined by using the conversion coefficient which is entered from the lens (steps #30, #35) to convert from the degree of focus deflection to the degree of lens driving. The lens is then driven according to the lens driving value, and the process advances to step #65. When the preparation switch is OFF in step #25, the process advances immediately to step #65. When AF mode is not selected in step #22, whether power focusing is ON or not is judged in step #40 depending on the input data from the lens. When power focusing is ON in step #40, a power focusing subroutine for driving the AF lens, depending on the operation direction of the operation ring on the lens side in step #50, is run, and the process proceeds to step #65.

Figure 9:
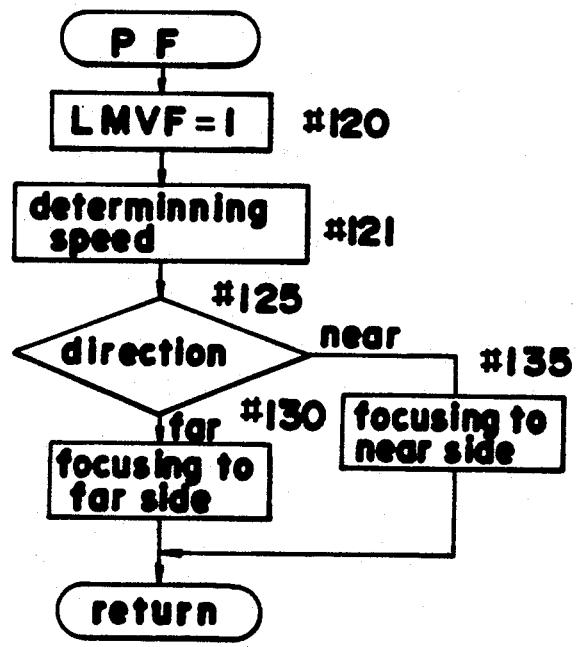

The power focusing subroutine is shown in FIG. 9. When this subroutine is called up, a flag LMVF indicating "currently driving lens" is first set (#120). In step #121, the driving speed is determined according to the amount of operation fed from the lens, and according to the operation direction data entered from/the lens, a signal for pulling back the AF Lens when the data indicates "far" or a signal for pushing forward the AF Lens when the data indicates "near" is delivered to the motor driving circuit, and the process returns to the main routine (step #120 through #135).

When power focusing is not judged to be ON in step #40 in FIG. 7, whether the flag LMVF indicating "currently driving lens" is set or not is judged in step #55. When the flag LMVF is set, it is regarded as the end of the operation, which is cancelled so as to stop power focusing. Then a subroutine to stop the drive of the AF lens is executed in step #60, and the process advances to step #65. When the flag LMVF is not set in step #55, the process proceeds to step #65.

Figure 10:
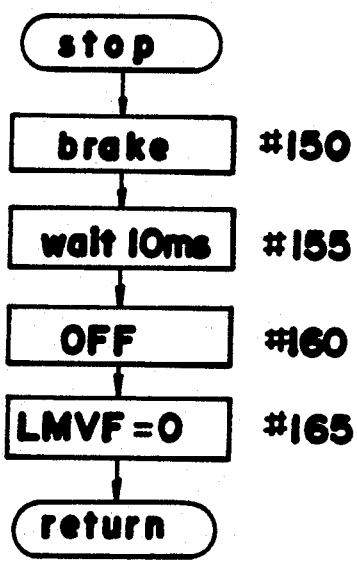

FIG. 10 shows a subroutine to stop the drive of the AF lens. When this subroutine is called up, a signal for short-circuiting both ends of the AF motor is delivered to the motor driving circuit MD1 in order to halt the AF motor, and the computer waits for 20 msec (steps #150, #155). Then a signal for turning OFF the AF motor is delivered to the motor driving circuit to reset the flag LMVF, and the process returns to the main routine (steps #160, #165).

When no lens is mounted in step #15 in FIG. 7, the transistor Tr for supplying the zoom motor is turned OFF in step #17, and the process advances to step #65. In step #65, whether the main switch is ON or not is judged. If the main switch SM is ON in step #65, SMON data is reset in step #70, and after waiting for 10 msec in step #71, the process proceeds to step #10. If the main switch is OFF, the AF motor is stopped in step #74, and the transistor Tr for supplying the zoom motor is turned OFF, and the process is halted here.

Figure 11:
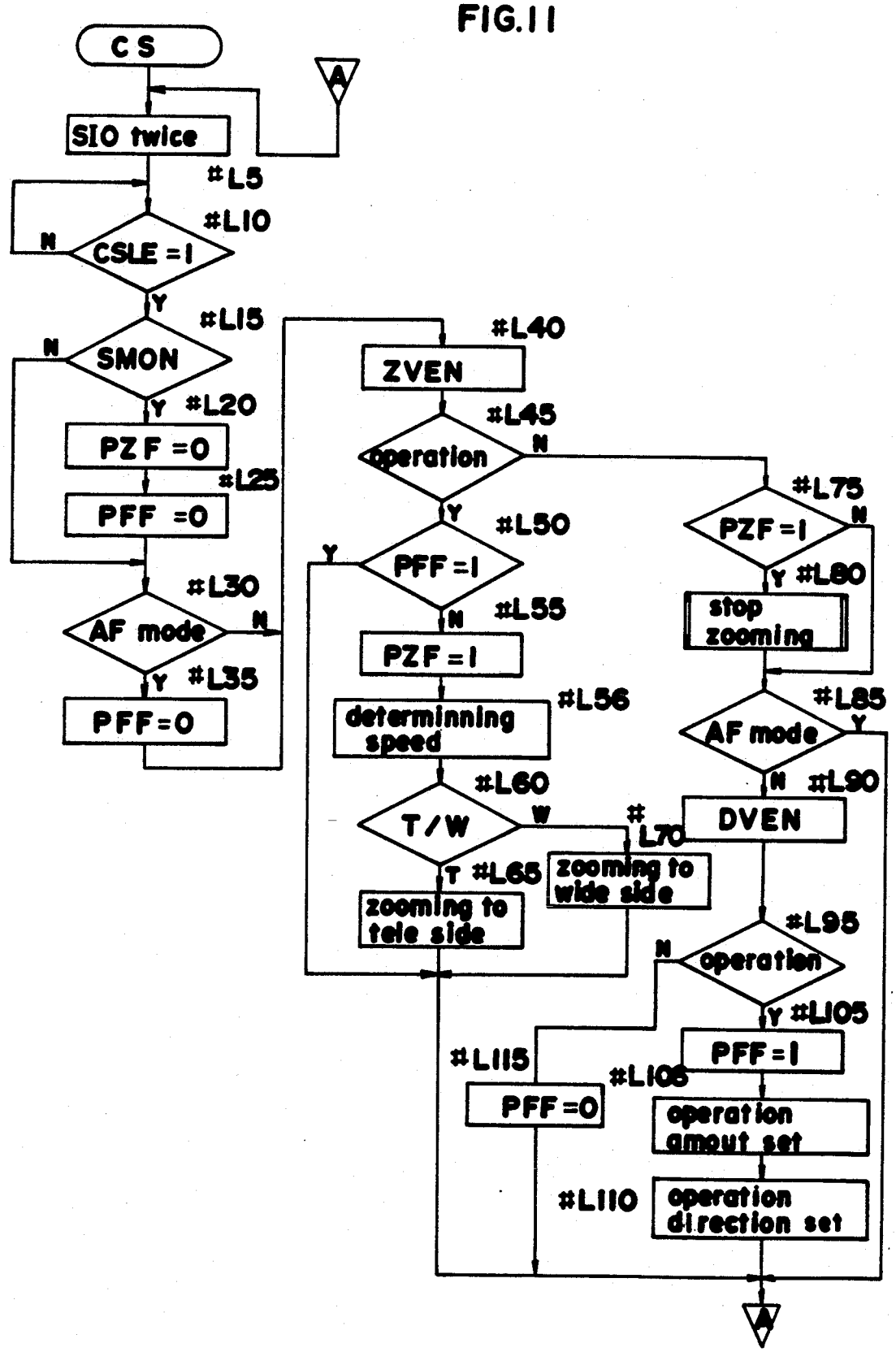
FIGS. 11 and 12 are flowcharts showing the action of the above interchangeable lens.

Operation of the in-lens microcomputer will be explained next by referring to FIGS. 11 and 12. When a CSLE signal is entered from the body, the in-lens microcomputer enters interrupt routine CS as shown in FIG. 11. It executes serial communication twice, waits for terminal CSLE to change to high level, and judges the presence or absence of SMON data (steps #L5 through #L15). When the existence of SMON data is detected, flag PZF, indicating power zooming, and flag PFF, indicating power focusing, are reset (steps #L20, #L25), and the process advances to step #L30. When no data is detected, steps #L20 and #L25 are skipped and step #L30 is executed. In step #L30, whether AF mode is selected or not is judged depending on the data entered from the body. When AF mode is selected in step #L30, flag PFF is reset in step #L35, and the process advances to step #L40. When AF mode is not selected in step #L30, step #L35 is skipped and step #L40 is executed. In step #L40, signal is inputed from encoder ZVEN. Whether the operation ring is rotated or not is judged in based on the signal in step #L45. When the operation ring is judged to be rotated in step #L45, whether power focusing is in operation or not is judged from flag PFF in step #L50. This latter step is executed to give priority to the earlier performed operation because it is possible, in this embodiment, both to rotate the ring and to move it back and forth at the same time. When flag PFF, indicating operation of power focusing, is set in step #L50, zoom driving is prohibited and the process advances to step #L5. When the above flag PFF is not set in step #L50, flag PZF, indicating power zooming, is set. In step #L56, the driving speed is determined according to the amount of operation detected by the signal from the encoder ZVEN. In step #L60 the operation direction is judged, and a control signal for driving the motor is delivered to the motor driving circuit so as to perform zooming to the telephoto side if the direction is judged as telephoto, or to the wide direction if it is judged as wide (steps #L55 to #L70), and the process proceeds to step #L5.

When the operation ring is judged not to be rotated in step #L45, step #L75 is executed; that is, whether flag PZF, indicating power zooming, is set or not is judged. When the flag is set, the operation is regarded as cancelled so as to stop zooming, a subroutine to stop zooming is executed in step #L80, and the process proceeds to step #L85. When the above flag PZF is not set in step #L75, step #L80 is skipped and step #L85 is executed.

Figure 12:
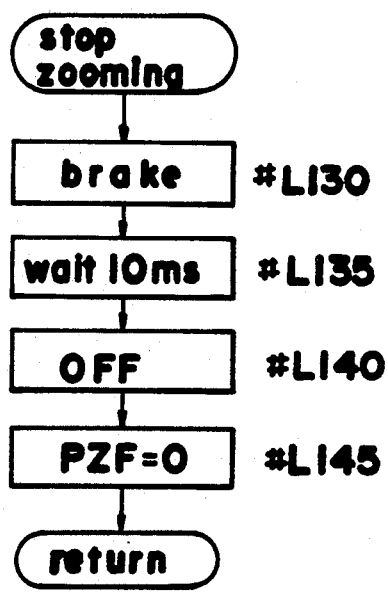

The above subroutine to stop zooming is shown in FIG. 12. When this subroutine is called up, a signal for short-circuiting both ends of the zoom motor is delivered to the motor driving circuit in order to halt the zoom motor, and the process then waits for 10 msec (steps #L130, #L135). A signal for turning OFF the zoom motor is delivered to the motor driving circuit, flag PZF is reset and the process returns to the main routine (steps #L140, #L145).

In step #L85, whether AF mode is selected or not is judged depending on the data entered from the body. When AF mode is selected, the process advances to step #L5 without executing operation of power focusing. Otherwise, a signal is inputed from encoder DVEN in step #L90. Whether the operation ring is operated back and forth or not is judged based on the signal in step #L95. When the operation ring is found to be operated back and forth in step #L95, flag PFF is set in step #L105, data on the amount of operation the operation direction are set in step #L106 and #L110 to send to the camera body, and the process proceeds to step #L5. When the operation ring is judged not to be operated back and forth in step #L95, that is, when the operation ring is not operated at all, flag PFF is reset in step #L115, and the process advances to step #L5.

The above embodiment is designed to execute power zooming by rotary operation of the operation ring and power focusing by shifting the operation ring back and forth, but it is possible to reverse these settings. Instead of an operation ring, it is also possible to use a joy stick or any other operation member having at least two methods of operation (at least four operation directions). Moreover, it is possible to use a zoom lens built into the body instead of an interchangeable zoom lens.

A second embodiment is explained below.

This embodiment is designed to execute power focusing when operation ring 30 is moved back and forth, and rotated thereafter. The mode change between AF mode and PF mode is performed automatically. That is, when moving operation ring 30 for power focusing, the mode is automatically changed to PF mode and focusing by autofocus is prohibited.

Figure 13:
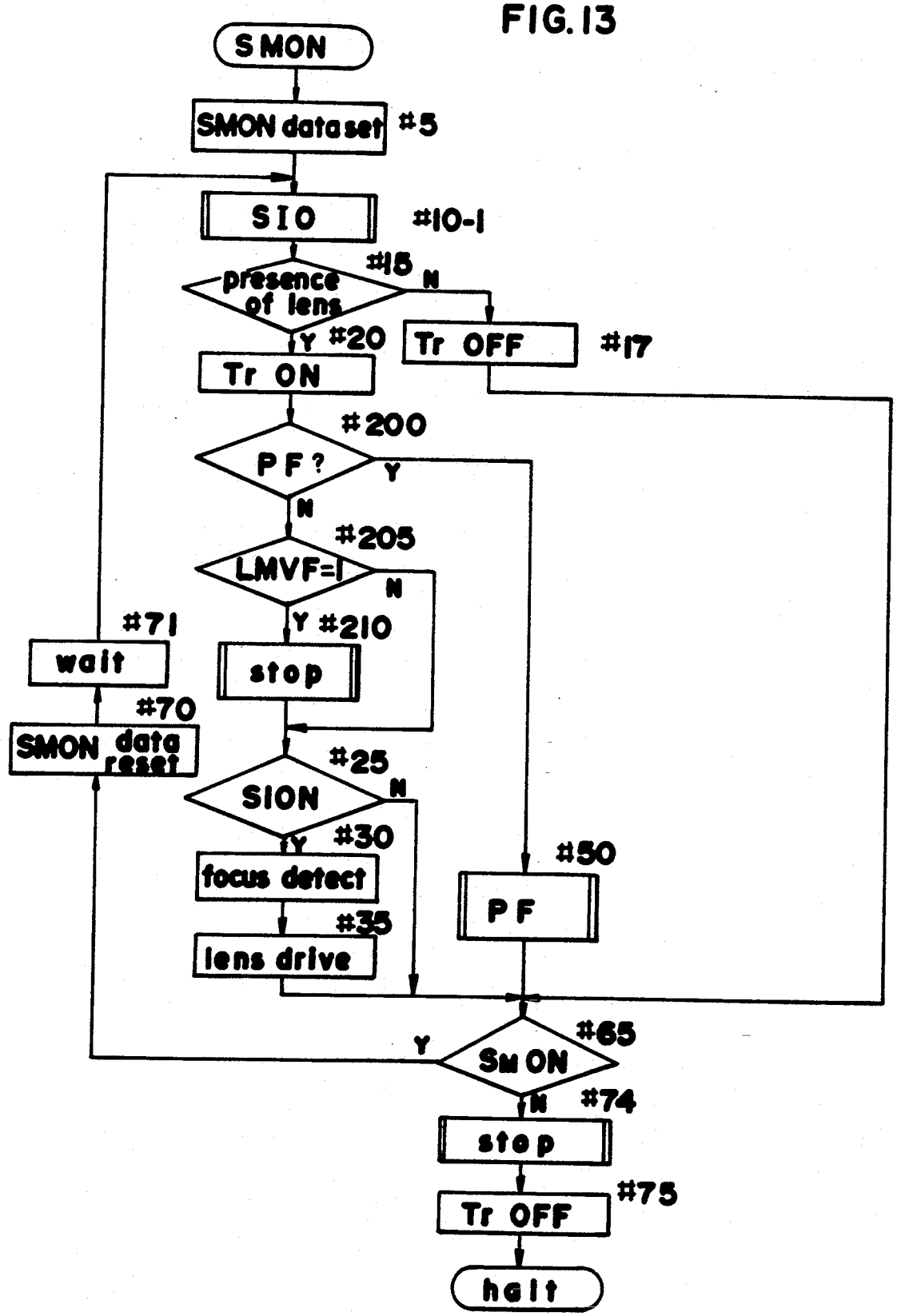
FIG. 13 is a flowchart showing the action of the camera body of a second embodiment of this invention.

The operation of in-body microcomputer $\mu$C1 is explained by referring to FIG. 13. Steps showing the same action as those in FIG. 7 are expressed by identical numbers, and their explanation is omitted.

Though data showing AF or PF mode is transmitted from the body to the lens in step #10 of the subroutine of serial communication in the first embodiment, data is not sent out in step #10-1 of serial communication in this embodiment.

In step #200, whether to execute power focusing or not is judged from data (PF or not) transmitted from the lens. When power focusing is selected, the process goes to step #50, otherwise to step #205 and whether a flag LMVF showing "lens drive in operation" is set or not is judged there. When flag LMVF is not set, the process goes to step #25. When the flag LMVF is set, the lens is stopped in step #210 and step #25 is executed. Then the same operation as described in AF mode is executed.

Figure 14:
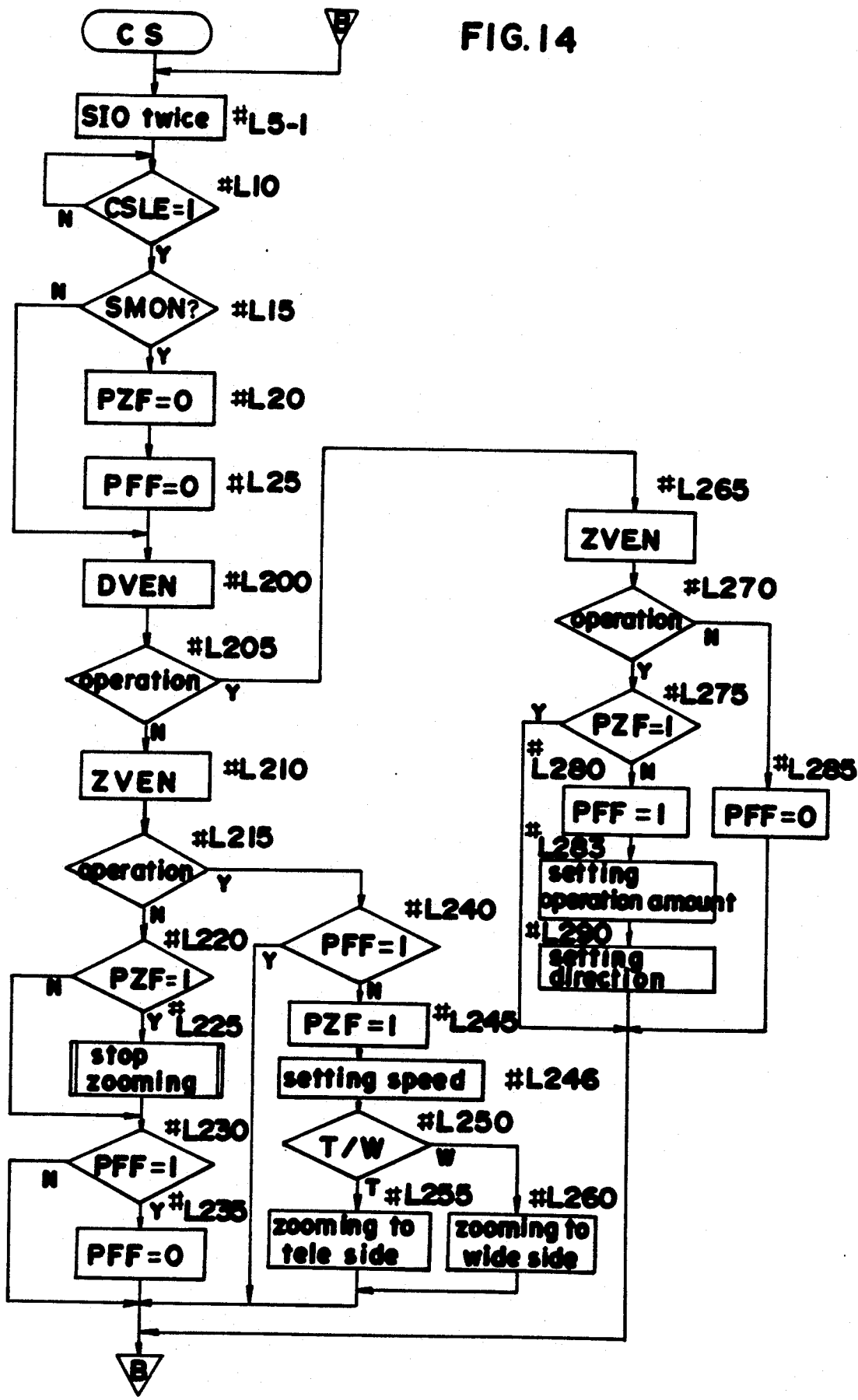
FIG. 14 is a flowchart showing the action of the above interchangeable lens.

Referring now to FIG. 14, the operation of in-lens microcomputer $\mu$C2 is described.

At first, serial communication is executed in step #L5-1. In this step, data showing AF or PF mode is not inputted from camera body as described before. The same operation up to step #L25 in FIG. 11 is performed and the process advances to step #L200.

The action thereafter differs depending on operation of operation ring 30. That is, when operation ring 30 is not operated at all, the process advances through step #L200 to #L235. When it is only rotated, the process advances from step #L215 to #L240, and the program for power zooming, #L240 to #L260, is executed. Or when it is moved back and forth, the process goes from #L205 to #L265, and the program for power focusing, #L265 to #L290, is executed.

Detailed actions in each step are explained below. In step #L200, data from encoder DVEN is input, and whether the ring is moved back and forth or not is judged. When the ring is moved back and forth, the process goes to the program for power focusing, that is, to step #L265. Otherwise, data from encoder ZVEN is input in step #L210, and whether the ring is rotated or not is judged in step #L215. When it is rotated, the process advances to step #L240, that is, the program of power zooming. Otherwise, it goes to step #L220. In step #L220, whether a flag PZF showing "power zooming in operation" is raised or not is judged. When the flag PZF is not set, the process skips #L225, and when the flag is set, zooming is stopped in step #L225 and step #L230 is executed. In step #L230, whether flag PFF showing "power focusing in operation" is set or not is judged. When it is not set, the process returns to step #L5-1, and when it is set, the process returns to step #L5-1 after resetting flag PFF.

When the ring is rotated in step #L215, the process advances to step #L240 to judge whether flag PFF showing "power focusing in operation" is raised or not. When the flag is set, the process returns to step #L5-1 without executing anything. When the flag is not set, a flag PZF showing "power zooming in operation" is raised and step #L246 is executed. In step #L246, the operated amount is detected depending on data from encoder ZVEN, and zoom speed corresponding to the operated amount is determined. In step #L250, operation direction of operation ring 30 is judged depending on data read from encoder ZVEN, and zooming is executed at the determined speed in telephoto direction when the ring is operated in tele direction (#L255), or in wide direction when the ring is rotated in wide direction. Then the process returns to step #L5-1.

When operation ring 30 is moved back and forth, the program advances from step #L205 to #L265. In step #L265, data from encoder ZVEN is input, and whether the operation ring 30 is rotated or not is judged in step #270. When it is not rotated, flag PFF showing "power focusing in operation" is reset and the operation returns to step #L5-1. When the ring is rotated, step #L275 is executed, that is, whether flag PZF showing "power zooming in operation" is raised or not is judged. When the flag is set, the process returns to step #L5-1 without doing anything. Otherwise, flag PFF showing "power focusing in operation" is displayed, and amount and direction to operate operation ring 30 are set depending on data from encoder ZVEN, and the process returns to step #L5-1.

Figure 15:
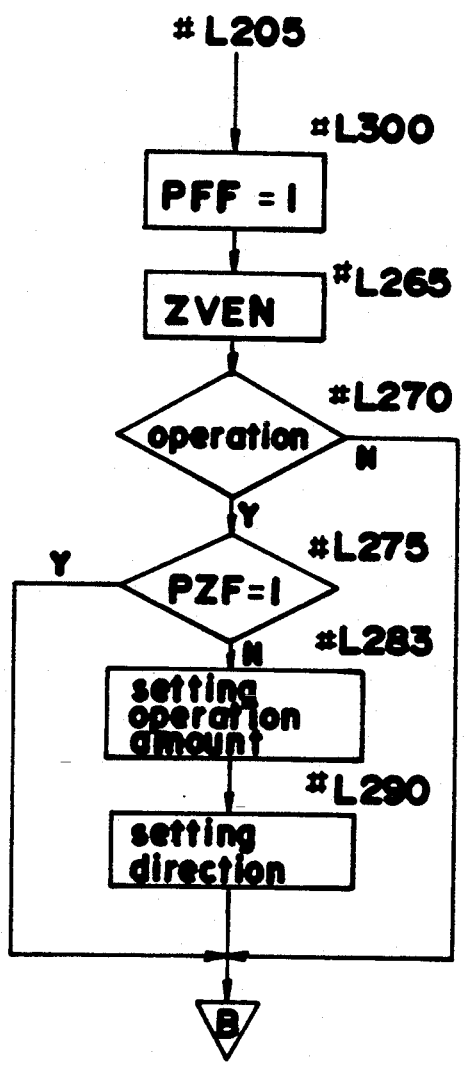
FIG. 15 is a partially modified example of the flowchart shown in FIG. 14.

As described above, the second embodiment is designed not to set flag PFF until rotary operation is executed after movement back and forth, and to prohibit autofocusing operation, and it is also possible, as described in FIG. 15, to design to raise flag PFF only by movement back and forth, and to prohibit autofocusing operation. In an embodiment shown in FIG. 15, instead of setting flag PFF in step #L280 as shown in an embodiment in FIG. 14, the flag is set in step #L300 before #L265. And the flag PFF is not reset even rotary operation is not executed.

It will be appreciated by those of ordinary skill in the art that the present invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. A camera comprising:
   (a) an operation member manually operable in the direction of clockwise, counterclockwise, back and forth;
   (b) first detecting means for detecting rotating movement of said operation member;
   (c) second detecting means for detecting back and forth movement of the above operation member;
   (d) power zooming means for executing zooming operation in response to output of one detecting means; and
   (e) power focusing means for executing focusing operation in response to output of the other detecting means.

2. A camera according to claim 1, wherein the power zooming means executes zooming operation in response to the output of the first detecting means, and the power focusing means drives the focusing lens in response to the output of the second detecting means.

3. A camera according to claim 1, wherein said camera includes a camera body and an interchangeable lens attachable to the camera body, wherein said operation member, and first and second detecting means are mounted on the interchangeable lens.

4. A camera according to claim 3, wherein the power focusing means comprises
   transmission means for transmitting the output of one detecting means to the camera body;
   focusing lens mounted in the interchangeable lens; and
   first driving means built in the camera body for driving said focusing lens,
   said first driving means driving said focusing lens responding to the output transmitted by the above transmission means.

5. A camera according to claim 3, wherein the power zooming means includes
   second driving means built in the interchangeable lens, for executing zooming operation in response to the output of one detecting means.

6. A camera comprising:
   an operation member, which is manually operable in at least three different directions;
   detecting means for detecting at least two operated directions of said operation member;
   controlling means responsive to the operated direction for controlling operation of said camera corresponding to the operated direction; and
   urging means for urging said operation member to a position.

7. A camera according to claim 6, wherein the three different directions are clockwise rotation, counterclockwise rotation and forward movement or backward movement.

8. A camera according to claim 7, wherein the control means comprises;
   power zooming means for executing zooming in a direction corresponding to the rotation direction of the above operation member when the member is only rotated; and
   power focusing means for executing focusing in a direction corresponding to the rotation direction when the above operation member is rotated while it is moved back or forth.

9. A camera according to claim 6, wherein said camera includes a camera body and an interchangeable lens attachable to the camera body, wherein said operation member is mounted in the above interchangeable lens.

10. A camera according to claim 6, wherein the above operation member can be rotated clockwise and counterclockwise, and moved back and forth, and said control means comprises
    power zooming means for executing zooming in response to detected direction of rotation of said operation member and
    power focusing means for executing focusing in response to detected direction of back and forth of said operation member.

11. A camera comprising:
    power zooming means;
    power focusing means:
    mode changing means changing modes between a mode to actuate power zooming means and a mode to actuate power focusing means;
    a single operation member; and
    control means for determining the zooming direction of the above power zooming means and the focusing direction of said power focusing means, and for changing the above modes in response to operation of the above single operation member.

12. A camera according to claim 11, wherein the control means comprises
    operated amount detecting means for detecting the moved amount of the above operation member and
    speed determinating means for determining the speed of zooming or focusing corresponding to the detected operation amount.

13. A camera according to claim 11, wherein said camera includes a camera body, and an interchangeable lens attachable to the camera body, wherein the above operation member is built in the interchangeable lens.

14. A camera comprising:
    an operation member linearly shiftable from a first position to a second position, and further rotatable in either of first and second positions;
    first detecting means for detecting the rotation of said operation member;
    second detecting means for detecting the position of said operation member;
    power zooming means, for executing zooming in a direction corresponding to the rotation direction when said first detecting means detects the rotation of said operation member while an output of said second detecting means indicates that the member is located at a first position; and
    power focusing means, for executing focusing in a direction corresponding to the rotation direction when said first detecting means detects that said operation member is rotated while the output of said second detecting means indicates that the operation member is located at a second position.

15. A camera according to claim 14, wherein the power zooming means executes zooming at a speed corresponding to an operated amount of the operation member, and the power focusing means executes focusing at a speed corresponding to an operated amount of the operation member.

16. A camera according to claim 1, wherein said power zooming means includes a zooming motor for driving a zooming optical system in response to output of one of said detecting means, and said power focusing means includes a focusing motor for driving a focusing optical system in response to output of the other of said detecting means.

17. A camera according to claim 8, wherein said power zooming means includes a zooming motor for driving a zooming optical system and said power focusing means includes a focusing motor for driving a focusing optical system.

18. A camera according to claim 10, wherein said power zooming means includes a zooming motor for driving a zooming optical system and said power focusing means includes a focusing motor for driving a focusing optical system.

19. A camera according to claim 11, wherein said power zooming means includes a zooming motor for driving a zooming optical system, said power focusing means includes a focusing motor for driving a focusing optical system, and said controlling means determines a driving direction of said zooming motor and a driving direction of said focusing motor.

20. A camera according to claim 14, wherein said power zooming means includes a zooming motor for driving a zooming optical system and said power focusing means includes a focusing motor for driving a focusing optical system.

21. A camera comprising:
an operation member;
driving means for driving a photographic lens;
manual focusing means for controlling a driving direction of said driving means in response to manual operation of said member in a first direction and for controlling a driving speed of said driving means based on an operation amount of said operation member in the first direction;
automatic focusing means having focusing detecting means for detecting focus condition of the photographic lens, and means for controlling said driving means based on the detected focus condition; and
forbidding means for forbidding an operation of said automatic focusing means in response to manual operation of said operation member in a second direction.

22. A camera according to claim 21, wherein the first direction is a rotating direction around an optical axis of the photographic lens, and the second direction is a direction parallel to the optical axis.

23. A camera according to claim 21, wherein said manual focusing means is operable while the operation of said automatic focusing means is forbidden by said forbidding means and is not operable while the operation of said automatic focusing means is performed.

24. A camera according to claim 21, wherein said operation member is movable between a first position in which the operation of said automatic focusing means is permitted and a second direction in which the operation of said automatic focusing means is forbidden, and is urged to the first position so as to start the operation of said automatic focusing means in response to releasing of the manual operation of said operation member.

25. A camera comprising:
an operation member movable between a first position and a second position in a first direction and movable in a second direction;
manual focusing means for manually focusing a photographic lens by moving the photographic lens in the direction corresponding to manual operation of the second direction of the operation member;
automatic focusing means having focusing detecting means for detecting focus condition of the photographic lens, and means for automatically focusing the photographic lens by moving the photographic lens based on the detected focus condition;
mode selecting means for selecting one of a first focusing mode in which focusing operation is performed by said automatic focusing means and a second focusing means in which focusing operation is performed by said manual focusing means, the mode selecting means selecting the first mode when said operation member is located in the first position and selecting the second mode when said operation member is located in the second position; and
urging means for urging said operation member to the first position so that said mode selecting means selects the first focusing mode in response to releasing of the manual operation of said operation member.

26. A camera according to claim 25, wherein the first direction is a direction parallel to an optical axis of said photographic lens and the second position is a position backward of the first position.

27. A camera according to claim 26, wherein said manual focusing means includes driving means for driving a focusing optical system in the photographic lens and drive controlling means for controlling said driving means in response to the operation of said operation member in the second direction.

28. A camera comprising:
an operation member movable between a first position and a second position in a direction of an optical axis of a photographic lens, the second position being backward of the first position;
automatic focusing means having focusing detecting means for detecting focus condition of the photographic lens, and means for automatically focusing the photographic lens by moving the photographic lens based on the detected focus condition;
forbidding means for forbidding an operation of said automatic focusing means when said operation member is located in the second position; and
urging means for urging said operation member to the first position so as to start the operation of said automatic focusing means in response to releasing of the manual operation of said operation member.

29. A camera according to claim 28, wherein said operation member is an operation ring disposed around a lens barrel of said photographic lens.

30. A camera comprising:
an operation member movable in a first direction and a second direction;
automatic focusing means having focusing detecting means for detecting focus condition of a photographic lens, and means for automatically focusing the photographic lens by moving the photographic lens based on the detected focus condition;
controlling means for controlling said automatic focusing means so that an automatic focusing operation of said automatic focusing means is performed when said operation member is not manually operated, and is forbidden when said operation member is manually operated in the first direction; and manual focusing means, operable while said operation member is manually operated in the first direction, for manually focusing a photographic lens by moving the photographic lens in the direction corresponding to manual operation of the operation member in the second direction.

31. A camera comprising:

an operation member movable in a first direction and a second direction;

power zooming means having driving means for driving a zooming optical system in a photographic lens and drive controlling means for controlling said driving means in reponse to manual operation of said operation member in the second direction; and forbidding means for forbidding the power zooming operation in response to an operation of said operation member in the first direction so that the power zooming means does not operate even if said operation member is operated in the second direction.

32. A camera according to claim 31, wherein the first direction is a direction parallel to an optical axis of said photographic lens and the second direction is a rotating direction around the optical axis.

33. A camera system composed of a camera body and an interchangeable lens attachable to said camera body, comprising:

photographic optical system disposed in said interchangeable lens;

an operation member, disposed on said interchangeable lens, said photographic optical system being manually adjusted in response to operation of said operation member in a first direction;

operation detecting means disposed in said interchangeable lens for detecting a manual operation of said operation member in a second direction, and for outputting an operation signal;

transmitting means for transmitting the operation signal from said interchangeable lens to said camera body;

driving means, disposed in said camera body, for driving said photographic optical system;

detecting means for detecting a condition of an image of an object formed by said photographic optical system;

automatic adjusting means for adjusting said photographic optical system by controlling said driving means based on the detected condition; and forbidding means disposed in said camera body for forbidding an operation of said automatic adjusting means in response to the operation signal.

34. A camera according to claim 33, further comprising second operation detecting means for detecting the operation of said operation member in the first direction and for outputting a second operation signal, and wherein said transmitting means transmits the second operation signal from said interchangeable lens to said camera body.

35. A camera system according to claim 34, further comprising manually drive controlling means for controlling said driving means in response to the second operation signal whereby said photographic optical system is manually adjusted.

36. A camera comprising:

a photographic lens;

first driving means for driving a zooming optical system in said photographic lens;

second driving means for driving a focusing optical system in said photographic lens;

power zooming means for controlling said first driving means in response to a manual operation in a rotating direction around an optical axis of said photographic lens; and power focusing means for controlling said second driving means in response to a manual operation in a direction parallel to the optical axis of said photographic lens.

37. A camera comprising:

a photographic lens;

first driving means for driving a zooming optical system in said photographic lens;

second driving means for driving a focusing optical system in said photographic lens;

zooming means for controlling said first driving means in response to a first manual operation in a rotating direction around an optical axis of said photographic lens;

automatic focusing means having focusing detecting means for detecting focus condition of a photographic lens, and means for controlling said second driving means based on the detected focus condition; and forbidding means for forbidding an operation of said automatic focusing means in response to a second manual operation in a direction parallel to the optical axis of said photographic lens.

38. A camera according to claim 37, wherein the camera is composed of a camera body and an interchangeable lens, and said camera further comprising transmitting means for transmitting an operation signal representing occurrence of the second manual operation from said interchangeable lens to said camera body; said first driving means and said forbidding means being disposed in said camera body and said forbidding means being activated in response to the operation signal transmitted from the interchangeable lens.

39. A camera comprising:

a photographic lens;

first driving means for driving a zooming optical system in said photographic lens;

second driving means for driving a focusing optical system in said photographic lens;

zooming means for controlling said first driving means in response to a first manual operation in a rotating direction around an optical axis of said photographic lens;

automatic focusing means having focusing detecting means for detecting focus condition of a photographic lens, and means for controlling said second driving means based on the detected focus condition;

manual focusing means for controlling said second driving means in response to a second manual operation in a rotating direction around an optical axis of said photographic lens; and mode changing means operable in response to a third manual operation in a direction parallel to the optical axis of said photographic lens for changing from a first mode in which said zooming means and said manual focusing means are activated to a second mode in which said manual focusing means is activated.

40. An interchangeable lens attachable to a camera body comprising:
- a zooming optical system;
- driving means for driving said zooming optical system;
- an operation member selectively operable in a first direction and a second direction;
- first detection means for detecting an operation of said operation member in the first direction, and for outputting a first operating signal;
- second detection means for detecting an operation of said operation member in the second direction, and for outputting a second operating signal;
- drive controlling means for controlling said driving means in response to the first operating signal; and
- forbidding means for forbidding the driving operation of said driving means in response to the second operating signal.

41. An interchangeable lens according to claim 40, wherein the first direction is a rotating direction around an optical axis of said interchangeable lens, and the second direction is a direction parallel to the optical axis.

42. An interchangeable lens according to claim 40, further comprising outputting means for outputting the second operation signal to said camera body.

43. An interchangeable lens attachable to a camera body which includes driving means for driving an optical system of said interchangeable lens and drive controlling means for controlling said driving means, said interchangeable lens comprising:
- an operation member selectively operable in a first direction and a second direction;
- first detection means for detecting an operation of said operation member in the first direction, and for outputting a first operating signal;
- second detection means for detecting an operation of said operation member in the second direction, and for outputting a second operating signal; and
- outputting means for outputting said first and second operation signal to said drive controlling means in said camera body, and said drive controlling means controlling said driving means in response to the first and second operating signal, wherein the first direction is a rotating direction around an optical axis of said interchangeable lens, and the second direction is a direction parallel to the optical axis.

44. An interchangeable lens according to claim 43, wherein the first direction is a rotating direction around an optical axis of said interchangeable lens, and the second direction is a direction of the optical axis.

45. A camera according to claim 7, wherein said controlling means comprises:
- power zooming means for executing zooming in response to detected direction of rotation of said operation member; and
- speed controlling means for controlling a zooming speed of said power zooming means based on an operation amount of said operation member.

46. A camera according to claim 7, wherein the position is a neutral position.

47. A camera according to claim 46, wherein the operation of said camera is not executed when said operation member is in the neutral position.

48. A camera according to claim 9, wherein said operation member is an operation ring disposed around a lens barrel of said interchangeable lens.

49. A camera according to claim 32, wherein said operation member is an operation ring disposed around a lens barrel.

50. A camera having a camera body and an interchangeable lens, comprising:
- driving means for driving a focusing lens built in a photo-taking lens of said interchangeable lens;
- autofocusing means for driving the driving means according to the focusing states of the photo-taking lens;
- an operation member mounted in said interchangeable lens;
- power focusing means for driving the driving means in a direction corresponding to operation of said operation member; and
- a switching member mounted in the camera body, for switching over by manual operation between actuating said autofocusing means or actuating said power focusing means.

* * * * *